United States Patent [19]
Brewer et al.

[11] Patent Number: 6,012,041
[45] Date of Patent: Jan. 4, 2000

[54] APPARATUS FOR THE CONTROL OF INVENTORY

[75] Inventors: Margaret Brewer, Solihull; George Arthur Taylor, Birmingham, both of United Kingdom

[73] Assignee: I.S.R. (Logistics) Limited, Birmingham, United Kingdom

[21] Appl. No.: 08/808,115

[22] Filed: Feb. 28, 1997

[30] Foreign Application Priority Data

Mar. 1, 1996 [GB] United Kingdom ............. 9604459

[51] Int. Cl.[7] ........................................ B65G 1/04
[52] U.S. Cl. .................. 705/28; 414/807; 414/276; 414/331
[58] Field of Search .................. 705/28, 29, 22; 414/807, 276, 331

[56] References Cited

U.S. PATENT DOCUMENTS

| | | | |
|---|---|---|---|
| 3,595,412 | 7/1971 | Billingsley et al. | 414/807 |
| 3,753,507 | 8/1973 | James et al. | 414/276 |
| 4,336,589 | 6/1982 | Smith et al. | 705/28 |
| 5,161,929 | 11/1992 | Lichti, Sr. et al. | 414/331 |
| 5,222,855 | 6/1993 | Bernard, II et al. | 414/331 |
| 5,246,332 | 9/1993 | Bernard, II et al. | 414/786 |
| 5,273,392 | 12/1993 | Bernard, II et al. | 414/807 |
| 5,319,544 | 6/1994 | Schmerer et al. | 705/28 |
| 5,537,313 | 7/1996 | Pirelli | 705/28 |
| 5,593,267 | 1/1997 | McDonald et al. | 414/273 |
| 5,593,269 | 1/1997 | Bernard, II | 414/331 |
| 5,671,362 | 9/1997 | Cowe et al. | 705/28 |
| 5,712,989 | 1/1998 | Johnson et al. | 705/28 |
| 5,720,157 | 2/1998 | Ross | 53/445 |
| 5,758,329 | 5/1998 | Wojcik et al. | 705/28 |

FOREIGN PATENT DOCUMENTS

| | | |
|---|---|---|
| 0 733 985 A2 | 9/1996 | European Pat. Off. . |
| 2 262 631 | 9/1996 | United Kingdom . |
| 88/04085 | 6/1988 | WIPO . |
| 89/07563 | 8/1989 | WIPO . |
| 90/11572 | 10/1990 | WIPO . |

OTHER PUBLICATIONS

Graves et al, U.S. Statutory Invention Registration H1743: Inventory Management Method and Apparatus, Publication Date: Aug. 4, 1998, Filing Date Mar. 17, 1995.

*Primary Examiner*—Allen R. MacDonald
*Assistant Examiner*—Jagdish N Patel
*Attorney, Agent, or Firm*—Pennie & Edmonds LLP

[57] ABSTRACT

An apparatus stores stock for retrieval at a later date. The apparatus maintains an inventory of the stock contained within and produces an invoice as stock is removed. A telecommunication apparatus is provided for allowing the apparatus to re-order stock items from remote sources as stock is removed. The stock monitoring is performed in real time and may allow restricted access to some of the stock.

19 Claims, 2 Drawing Sheets

APPARATUS FOR THE CONTROL OF INVENTORY

TECHNICAL FIELD

This invention relates to an apparatus for controlling, and monitoring the flow of a company's inventory of stock, for example safety equipment and the like.

BACKGROUND ART

It is well known for a company to maintain a stores department. As such, a stock of items which are required by the company in its every day operation are kept within the stores department. Such stores departments suffer from a number of disadvantages.

Often a large number of items are maintained within the stores which in itself can create more disadvantages. Maintaining a large number of items involves investing a large amount to purchase the items. Also as the number of items in the stores increases the problems of tracking the items of stock increases. It is not unheard of for an item to be purchased and then to be lost within the company's stores.

It is an aim of this invention to solve, or at least ameliorate, at least some of the problems outlined hereinbefore.

SUMMARY OF THE INVENTION

According to a first aspect of the invention we provide an apparatus for monitoring and controlling stock, comprising storage means, stock level monitoring means, retrieval means, invoice producing means, telecommunications means, delivery means, and processing means. The storage means, in use, holds the stock, with the retrieval means being adapted, in use, to deliver the stock to the delivery means where the stock can be removed from the apparatus. The processing means being is adapted, in use, to monitor the storage means and the level of the stock in the storage means and is responsive to signals from a stock level monitoring means to order the stock via the telecommunications means. The invoice producing means is adapted to produce an invoice for each item of stock retrieved in response to signals from the processing means, the arrangement being such that when the item of stock is retrieved an invoice is produced.

An advantage of such apparatus is that it allows the stock within the storage means to be monitored and therefore may prevent items of stock being lost within the company's stores. Obviously if an item of stock is lost then it must be reordered, wasting the cost of the item. It is known for an item to be lost and then found again, but by the time it is found to be obsolete. Money can be wasted by losing stock, even if it is found again.

Preventing items of stock from getting lost may also further save money in that if nothing is lost then nobody will be required to look for it, and thus that person's time will not be wasted.

The apparatus may be provided with input means for allowing data to be input. An advantage of having such an input means is that the apparatus can be controlled as desired.

Preferably a housing is provided which contains the stock level monitoring means, the retrieval means, the telecommunication means, the delivery means and the processing means. Preferably the input means, the invoice producing means and the telecommunication means are connected to the processing means.

Preferably a user must input via the input means the item of stock which they require the retrieval means to produce, so providing a convenient way of retrieving the stock within the storage means.

Preferably the user must input via the storage means their identity (which may be a unique code, or a password, or the like). Such a requirement may provide a way of restricting access to the goods within the apparatus. An advantage of restricting access to the machine is that theft from the companies stores may be reduced, or made more difficult.

A hierarchical password system may be used in which certain passwords give access to certain goods. An advantage of this would be that access to high value goods could be restricted to certain people whereas low value goods could be put on general access (ie accessible to anyone using the system).

Preferably the processing means further comprises recording means. This may provide a way of recording the operation of the apparatus.

The recording means may record the item of stock that said retrieval means produces, and may also record the identity of the person who retrieves it. Thus, traceability may be introduced by the apparatus. This has the advantage that theft may be further reduced.

It is known for a company's stores to stock goods which have a limited shelf life. The recording means may note an expiry date on an item with a limited shelf life. An advantage of this is that the storage apparatus may prevent items which have passed their expiry date from being used.

This has the further advantage that it will aid a company to meet the safety regulation ISO 9002 (quality accreditation). Part of this regulation requires that all goods mused must be used before their expiry date.

It will be realised that if an out of date product is used, such as for example a glue, and that product subsequently fails the company will be liable for any injury caused; because an out of date product was used.

The storage apparatus may preferentially produce stock items which are near to their expiry date over those which have a later expiry date. This has the advantage that stock items are more likely to be used before they reach the end of their shelf life.

Products with a limited shelf life may be assigned an identity code, which may be unique. This may allow the product to be traced.

Preferably the recording means may record the identity code assigned to the product. An advantage of this is that traceability of the product is maintained.

The recording means may associate who ordered a product with a limited shelf life with the code assigned to the product. This has the advantage that traceability is further increased and it may be able to be proved that a product used by a particular person for a particular task was valid or not (i.e. within its date limit).

Some of the items of stock within the storage means may be items that employees of the company are required to use by various safety rules and laws (safety items). A further advantage of recording who causes the retrieval means to produce the item and what item was produced by the retrieval means is that it can be proved that that particular person was issued with a particular safety item.

This may be important for the company if an industrial accident occurs. If the person was not wearing their safety equipment, the recording means may be able to be used to prove that safety equipment was in fact issued to that person.

Thus, the company may be able to use the recording means to escape prosecution over breach of safety rules.

Further, the recording means may record the identity of a person to whom safety items are issued (for example that person's clocking in number). This further increases the ability of the apparatus to correlate the issue of safety items.

A user of the storage apparatus may be able to define which retrievals of stock, held within the storage means, will cause the recording means to record the identity of a person to whom safety items are issued. This increases the flexibility of the storage apparatus and may allow the user to track any item of stock in which they are particularly interested.

Preferably the recording means records what item of stock was issued, to whom it was issued, when it was issued and may be searched according to at least those criteria. An advantage of this is that it can be checked relatively easily whether or not a particular item of stock was issued to a person, or was issued on a particular date, or both.

The apparatus may further comprise report producing means. The report producing means may produce reports based upon the data stored on the recording means. An advantage of such reports is that a permanent record of the data stored is produced. Such reports may also make it easier to examine the data stored on the recording means and may be able to be used to aid decisions as to what items need to be in the stores.

Preferably the report producing means may allow reports to be produced which detail what items of stock were produced, to whom they were produced, and at what time and date they were produced. An advantage of this is that a permanent record is produced for the safety records of the company.

The report producing means may further allow reports to be produced which list data according to at least one of the following criteria: stock removed from said apparatus in any time span (where the time span may be in the last hour, may be the last day, may be the last week, may be the last month, or may be any other time span); stock removed from said apparatus under a particular contract (the recording means may also record on which contract goods removed from said apparatus are to be used); the person removing goods from said apparatus; or on other user definable criteria. This produces a highly flexible system tailoring reports to a users requirements.

The report producing means may produce a report which links the code associated with a product with a limited shelf life to the person that ordered such a product. This may increase the traceability and safety accountability of the company.

Alternatively, or additionally, the telecommunications means may be connected to a remote terminal means. The terminal means may have no processing power and simply allow access to the processing means. An advantage of this is that costs are reduced. Hereinafter the phrases remote processing means may be replaced with remote terminal means.

The telecommunication means may be connected to a remote processing means, providing a convenient way of processing orders sent by the processing means.

The storage means may, in use, be replenished automatically. That is when an item of stock in the storage means is running low, the processing means may alert, via the telecommunications link, the remote processing unit that the item is running low. Appropriate action may then be taken by personnel operating the remote processing link. Alternatively, the remote processing means may automatically order new items if it receives a signal indicating that they are running low.

The item of stock may be deemed to be running low when the number of items of stock fall below a minimum threshold limit.

In fact a perpetual inventory may be created. That is the storage apparatus may always be able to display (perhaps on the input means) how many items of a particular kind it has within it. This has the advantage that a company will always be aware of whether it has enough items to perform a particular task. A perpetual inventory may reduce the need (or even eliminate) the need for stock counts.

The storage apparatus may actually count how many items of stock are maintained within the storage means, providing an accurate inventory. This may be more accurate than weighing items of stock. (The weight of a single item may vary between different articles, the articles could become contaminated, etc.) Further, it may also be more secure to count stock items; weighing apparatus may be made to misread quite readily.

Monitoring the actual number of stock items may be applicable to large high value stock items.

The perpetual inventory may be maintained in real time; that is as items are removed from the storage apparatus the number of items that it is believed are held within are decremented by the correct amount.

Display means may be provided which display information from the storage apparatus, perhaps from the processing means or that stored on the recording means. An advantage of this is that information can readily be seen and checked.

A further advantage of the display means is that mistakes can be seen in the information as it is input via the input means (if input data is displayed on the display means) allowing them to be corrected.

The display means may be part of the input means, or may alternatively or additionally be provided on the storage apparatus itself.

An important aspect of some embodiments of the invention may be a capability of the apparatus to produce reports on the report producing means or to display information on the display means relating to the perpetual inventory.

The invoice producing means may be provided within the housing means of the storage apparatus. Alternatively, or additionally, the invoice producing means may be provided remote from the storage apparatus. Each of these options has its own separate advantages.

The invoice producing means may also produce purchase orders.

For instance producing an invoice (perhaps a printed one) within the storage apparatus has the advantage that a record is produced on which it is readily apparent what has been removed from the storage means. The advantage of transmitting the invoice to a remote place (perhaps via the telecommunication means) is that the remote processing means may maintain a log of what was removed from the storage means.

The remote processing means may be within the accounts department of a first company. This may allow the accounts department to maintain and up to date list of the expenditure of the first company.

Alternatively or additionally the remote processing means may be in the premises of a second company.

The processing means may transmit via the telecommunications link statements regarding the operational condition of the storage apparatus. An advantage of this is that the second company may be kept informed of condition of the apparatus.

Preferably, the processing means transmits via the telecommunications means service notices. Such service notices may alert the second company that the storage apparatus is in need of a service or has malfunctioned.

Alternatively or additionally the second company may be in charge of refilling the storage means. As such the processing means will be able to alert the remote processing means via the telecommunication link at the second company that the storage means needs refilling.

Should the second company be in charge of refilling the storage means it is advantageous to transmit purchase orders to the second company. The second company may consequently be able to check off what has been delivered against what has been ordered in the purchase order.

The retrieval means may automatically deliver an item of stock from the storage means in response to an input to the input means. An advantage of this is that it is quick and easy to retrieve an item of stock.

A further advantage of having automatic retrieval means is that the number of personnel required to operate the machine is reduced. Also, the it may allow the storage means to be more compact and, thus save space.

Preferably the retrieval means further comprises memory means which notes where each item of stock is located in the storage means. This also has the advantage that it makes it quick and easy to retrieve an item of stock.

The stock level monitoring means and the retrieval means may be integral with one another. Alternatively, the stock level monitoring means and the retrieval means may be separate means.

The retrieval means may comprise one or more containers arranged on a chain means. An advantage of using containers is that it provides a convenient way of holding items of stock.

Preferably the containers are moveable within the storage means, enabling different containers to be presented at the delivery means. This may provide a simple way of retrieving the desired item of stock from the storage means.

The chain means may comprise a loop. An advantage of using a loop is that the retrieval means may only have to be moved in one direction to present the containers at the delivery means. It will be realised that if a loop is driven in one direction a point along it repeatedly pass a fixed point next to the loop.

Preferably the chain means is a chain. An advantage of using a chain is that maintenance is reduced.

Alternatively, the chain means may be a toothed belt, a 'v' section belt, or other suitable structure.

Preferably the memory means of the retrieval means allows the shortest path along the loop of the chain means to be determined (perhaps by the processing means). This may allow the chain means to be driven in the appropriate direction to retrieve the item of stock in the shortest possible time.

The delivery means may comprise a port through the storage means which allows the containers of the retrieval means to be accessed. Such a port may provide a simple, yet effective way to retrieve goods held within the storage means.

Sensor means may be provided in relation to the delivery means. Such sensor means may ensure that the retrieval means is not moved while foreign bodies (for example limbs of operators, or stock items) are obstructing the path of the retrieval means. This has the advantage that the safety of the storage means is increased.

The sensor means may comprise an a transmitting means and receiving means, in use, being adapted to produce a beam which is interacted with by foreign bodies. Such a sensor has the advantage that an unobtrusive, effective way of detecting foreign bodies is provided.

The transmitting means may transmit visible light, infrared light, or ultrasound. The produced beam may be broken or reflected, the receiving means will then respectively detect the absence of the beam or the presence of the beam.

The input means may be remote from the storage means. This may allow items of stock to be retrieved from a remote station. An advantage of this is that a person could attempt to order an item of stock (to see if the item is within the storage means) before travelling to the storage means.

Preferably the processing means communicate to the input means the current status of the apparatus. Thus, remote input means may be alerted if there is a problem with the machine.

Most preferably the input means is alerted to a fault in the storage apparatus if the communications of the current status are lost (or other failure of the machine resulting in loss of communications). This has the advantage that a user is alerted to a problem that has occurred with the storage apparatus which has resulted in its failure. Indeed having the processing means communicate with the input means may alert the input means to the fact that someone is tampering with the apparatus (perhaps by trying to disconnect the input means).

It is further envisaged that the remote processing means may be provided with a second telecommunication link. The second communication link may be used to order stock items directly from their source. This may allow items of stock which are running low within the storage means to be replaced quicker than they would usually be the case.

That is, in use, when an item of stock in the storage means is running low, the processing means may alert, via the telecommunications link, the remote processing unit that the item is running low. The remote processing link may then be able to place an order for the item of stock in question using the second communication link, which is to the supplier of the item of stock.

Preferably the stock level monitoring means may keep a count of the number of items of stock within the machine, and update this level after each retrieval of an item of stock. This has an advantage that an up to date record of the contents of the storage apparatus is maintained; that is the level is maintained in real time.

A further advantage of monitoring stock level when in conjunction with the requirement for a user to enter a password is that the level of stock is actually controlled rather than merely being monitored.

The items of stock held within the storage means may not be owned by the first company. The items of stock may be owned by the second company and the first company may be invoiced for the item only when the item is retrieved from the storage means.

Alternatively or additionally, goods within the storage means may be owned by companies other than the first and the second companies, in which case the processing means may be adapted, in use, to monitor (and may record on the recording means) which items of stock are owned by which company. Monitoring of who owns which stock may also happen if the goods are solely owned by the first and/or the second company.

Should the items of stock, within the storage means, be owned by the first company (i.e. the company in which the storage apparatus is situated) the first company will not be invoiced for goods removed from the storage apparatus (since they already own them). However, any of the other advantages of the storage apparatus will be realized. For example the password security, the keeping track of the items of stock, the automatic re-ordering or any of the other advantages discussed herein.

The report producing means may be able to produce reports which include which company owns which particular items of stock.

An advantage of such an apparatus is that much more accurate stores records can be maintained. Accurate records may be desirable because companies often tie large amounts of capital up into stores, and thus it may be beneficial to the company to be able to trace all the goods leaving the stores.

A further advantage of the apparatus is that alerting a remote site to the retrieval of items allows the storage device to replenished without the first company having to order the item.

An advantage of recording the identity of the person retrieving the storage means is that a record is maintained of who received each item of stock.

Alternatively, or additionally, the person retrieving the item of stock may have to enter the identity of the person that they are retrieving the goods for. This may allow a single person to operate the machine.

The processing means may be able to prevent the retrieval means from delivering stock to said delivery means and thus prevent the removal of the stock from the storage apparatus once the processing means has been instructed accordingly. An advantage of this is that should an item of stock be found defective the processing means can be instructed accordingly and the further issue of those items of stock is prevented. This prevents further use of the defective goods.

Should a hierachrical password system be used only certain passwords may be adapted to prevent the retrieval means from delivering stock to the delivery means. An advantage of this is that only certain users would be able to prevent the issue of stock items.

A further advantage of being able to prevent the retrieval means from delivering stock to said delivery means is that it is much cheaper for the first company to be able to prevent an item of stock being removed from said storage apparatus than to have to recall finished products incorporating a defective part, and money is therefore saved.

The processing means (perhaps in conjunction with the recording means) may allow a user (the first company) to pre-allocate certain stock held within the storage means. An advantage of this is that if the first company knows in advance that they will require a large quantity of certain items of stock (perhaps for a certain project) those items can be pre-allocated; preventing them from being used for different projects. This may ensure that the first company always has enough of a particular item of stock for a certain project.

Should the pre-allocation of an item of stock take the number of un-allocated items of that particular stock item below a minimum threshold limit the processing means may alert, via the telecommunications link, the remote processing unit that the stock item is running low (as may be the case if the actual number of items in the storage means fell below the minimum threshold limit).

It will be realized that if items of stock are pre-allocated the total of those items of stock in the storage means would be the sum of the un-allocated items and the pre-allocated items. Therefore, although the total number of items of stock within the storage means may exceed the minimum threshold limit, the un-allocated number may be below it (in which case the stock may be re-ordered).

The first company may be able to un-allocate an item of stock once it has been allocated.

BRIEF DESCRIPTION OF THE DRAWINGS

An embodiment of the invention will now be described by way of example only with reference to the accompanying drawings of which.

DETAILED DESCRIPTION OF THE PREFERRED EMBODIMENTS

Figure 1:
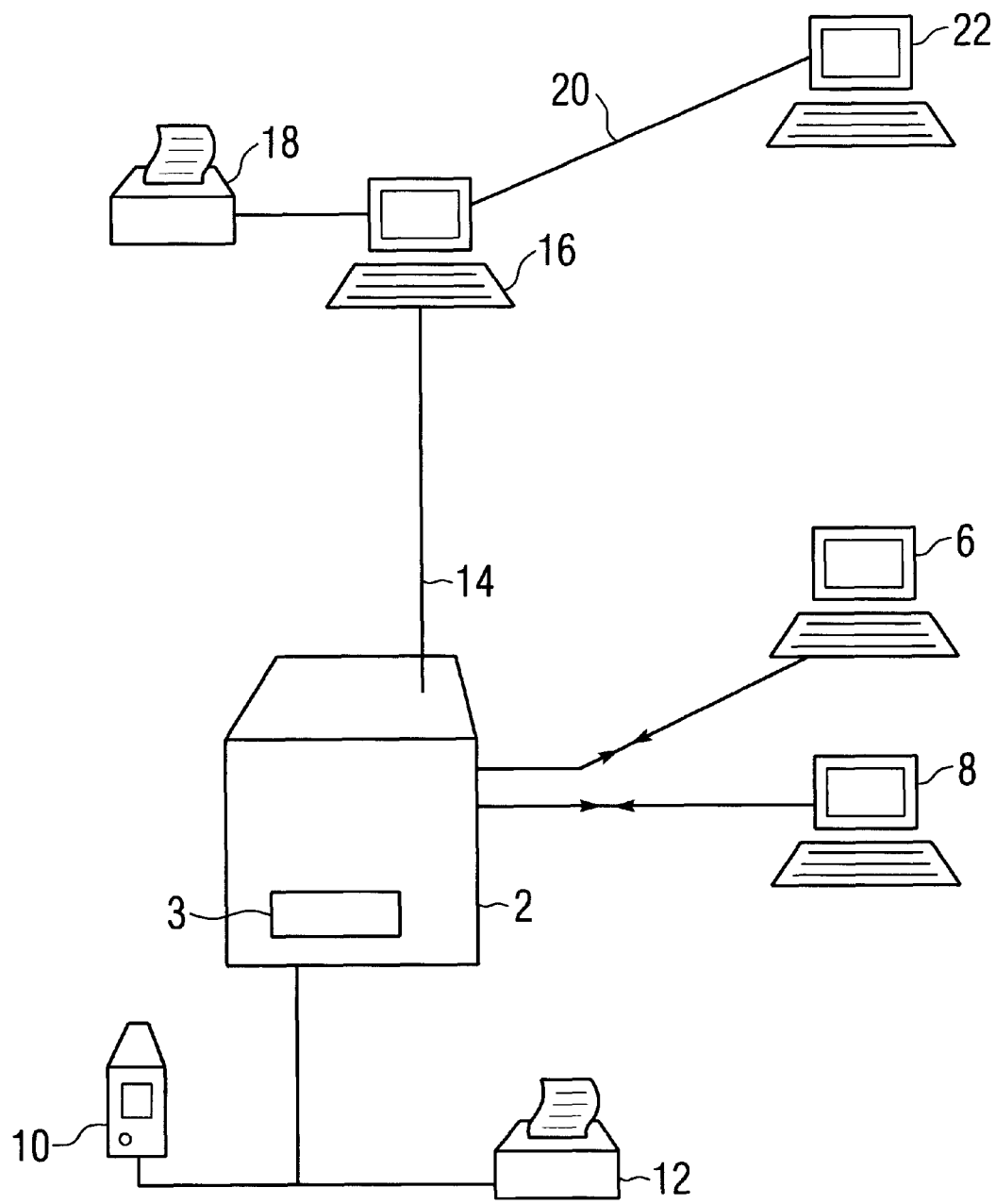
FIG. 1 shows a schematic of an embodiment of the invention.

The system comprises storage apparatus 2 with an outlet 3 for delivering stored items. The system further comprises processing means and retrieval means (both of which are not shown in this Figure). The input computers (input means) 6,8 have input keyboards and are linked via an RS232 link which operates at 9600 baud, to the storage apparatus 2.

The input computers are programmed to perform as required. Alternatively the input means may be dedicated keypads.

A hard disk drive 10 (recording means) and a printer 12 (invoice producing means) are also connected to the processing means of the storage apparatus 2.

A telecommunication link 14 is provided which links the storage apparatus 2 to a remote computer 16 (a remote processing means). The remote computer 16 is further linked to a printer 18.

A second communication link 20 is provided between the remote computer 16 and a further computer 22.

In this example both of the telecommunications links comprise a telephone line linked to the processing means/computer with a modem. The modem can operate at any baud rate (in this example they operate at 33,300 bits/sec, conforming to the V34 standard allowing the greatest throughput of data). It will however, be realised that other telecommunications links may be used, such as an ISDN line linked with an adapter to the computer/processor means or a leased line.

Figure 2:
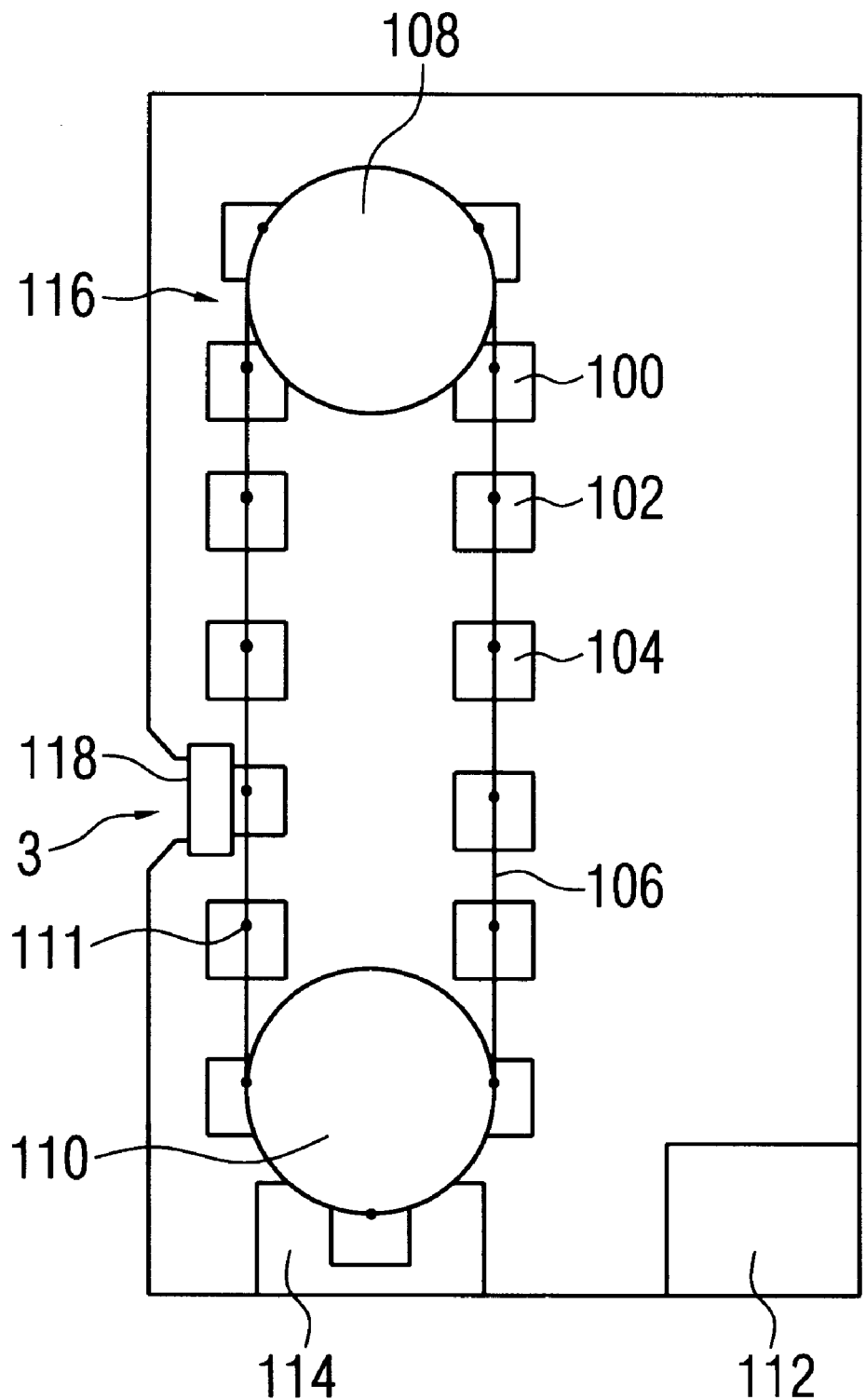
FIG. 2 shows a schematic of the inside of the storage apparatus of the embodiment of FIG. 1.

The internal workings of the storage apparatus 2 can be more clearly seen in FIG. 2.

The storage apparatus 2 has within it a number of storage containers 100, 102, 104, which contain the items of stock stored, and which are arranged on a self lubricating, self tensioning chain 106, which passes around two drive wheels 108, 110. An electric motor 114 with appropriate gearing is provided in communication with the drive wheel 110.

There are over 400 storage containers 100, 102, 104 provided in the storage apparatus 2.

The chain 106, together with the containers comprise retrieval means 116 of the storage apparatus. The containers 100, 102, 104 are pivotally mounted by pivots 111 on the chain.

The electric motor 114 is a three phase A.C. spark free motor powered at 5 volts. This allows the storage device to be operated within zone 1 safety areas.

A sensor 118 is provided which detects the position of the storage containers 100, 102, 104. The sensor 118 comprises and infra-red L.E.D. and semiconductor receiver tuned to the same frequency at which the L.E.D. transmits.

The processing means 112 monitors the running of the storage apparatus 2 and communicates with the input computers 6, 8. If an error occurs within the operation of the storage apparatus 2 the processing means 112 alerts the input computer 6, 8 that something is amiss.

In operation a user enters their identity at one of input means 6, 8. Once the identity of the user has been verified access to the system is gained. The user enters the identity of the stock item which they require, and the item is then dispensed at the outlet 3.

To dispense the stock item the processing means 112 activates the electric motor 114. This activation rotates the drive wheel 110, causing the belt 106 and the drive wheel 108 to also rotate. The processing means 112 allows the motor 114 to remain activated until the container 100, 102, 104 containing the desired stock item is presented at the outlet 3.

The processing means 112 determines when a container is presented at the access means by way of the sensor 118. The processing means 112 can also determine whether foreign bodies would foul the containers 100, 102, 104 and chain 106 if the motor 114 were activated.

The processing means 112 keeps track of the position of the containers within the storage apparatus 2, and calculates the optimum direction to rotate the drive wheel 110.

Once the container 100, 102, 104, arrives at the outlet 3 the item of stock can be collected.

It will be realized that because the person ordering the stock item has entered their own identity code, if more goods are taken from the container than requested the goods taken may be traced back by the identity code to that particular person. Therefore there is a low likelihood of theft occurring.

The processing means, within the storage apparatus 2, records the identity of the user placing the order together with the identity of the item of stock ordered on the disk drive 10. After this has been performed the processing means opens a communications link to the remote computer 16 using the link 14.

Once a communication link is established the processing means sends details of the transaction to the remote computer 16, which also records the transaction, and prints details of the transaction on the printer 18.

The remote computer 16 generates an invoice for the goods ordered from the storage apparatus 2. The company in whose premises the storage apparatus 2 is situated is then invoiced for the goods removed from the storage apparatus 2.

The processing means 112 also monitors the level of stock within each of the storage containers 100, 102, 104. Every time an item of stock is retrieved from the apparatus the processing means 112 decrements the number of that particular item it believes to be maintained within the system. When the level of a particular item falls below a predetermined threshold the processing means 112 also opens a communication link to the remote computer 16, and alerts the remote computer 16 that that particular item of stock needs reordering.

In the embodiment shown this reordering can be done automatically. Once the remote computer 16 receives notification that the storage means is running low of a particular item, it can establish communication with the remote computer 22 via the communication link 20. The further remote computer 22 may be within the premises of a supplier who can then deliver the goods to the storage apparatus 2.

It is envisaged that a numeric keypad with a simple LCD panel could be used as an input means. If this were the case then a user would have an identity code which comprised only a number, and all of the items of stock within the machine would be identified with only a number.

In the specific example given the storage apparatus 2 is shown with a housing. The invention would be equally applicable to open racking. In which items were removed from the racks and the identity of the item removed indicated to the storage apparatus.

The storage apparatus may allow paperless ordering of stock items to be performed and may also allow the paperless delivery of stock items. (Paperless meaning that no paper must be used to place an order or receive items of stock from the storage means).

The delivery means may not be essential. Further, the retrieval means may also be inessential. That is one of, or both of the retrieval and delivery means may be inessential to the invention.

What is claimed is:

1. An apparatus for monitoring and controlling stock, comprising storage means, stock level monitoring means, retrieval means, invoice producing means, telecommunication means, delivery means, recording means, and processing means; said storage means, in use holding the stock, said retrieval means being adapted, in use, to deliver said stock from said storage means to said delivery means where said stock can be removed from said apparatus, said processing means being adapted, in use, to monitor said storage means and the level of said stock in said storage means and responsive to signals from said stock level monitoring means being adapted to order said stock via said telecommunication means, and said invoice producing means being adapted to produce an invoice for each item of stock retrieved in response to signals from said processing means, the arrangement being such that when the item of stock is retrieved an invoice is produced; said recording means capable of recording an expiry date on stock having a limited shelf life and said processing means being capable of causing said delivery means to preferentially deliver stock having an earlier expiry date.

2. An apparatus according to claim 1 which further comprises input means, said input means allowing data to be input.

3. An apparatus according to claim 2 in which, in use, a user must input via said input means the item of stock which they require said retrieval means to produce.

4. An apparatus according to claim 2 in which the retrieval means automatically produces an item of stock in response to inputs on said input means.

5. An apparatus according to claim 2 in which said input means is remote from said storage means.

6. An apparatus according to claim 2 in which said input means is alerted to a fault in said apparatus if communications of the current status between said apparatus and said input means are lost.

7. An apparatus according to claim 1 in which, in use, said recording means records the identity of an item of stock which said retrieval means produces.

8. An apparatus according to claim 1 in which said recording means records the identity of an item of stock as it is issued and to whom it was issued.

9. An apparatus according to claim 1 which further comprises report reproducing means which produces reports based upon data stored on said recording means.

10. An apparatus according to claim 9 in which the report producing means, in use, produces reports which detail, at least, what items of stock were retrieved, who retrieved them and the time and date that the retrieval occurred.

11. An apparatus according to claim 1 which further comprises a display means capable of displaying information held on said recording means or information provided from said processing means.

12. An apparatus according to claim 1 in which said telecommunication means are connected to a remote terminal.

13. An apparatus according to claim 1 which, in use, replenishes items of stock held within said storage means automatically after the item of stock is retrieved.

14. An apparatus according to claim 1 which, in use, transmits via said telecommunications means information relating to the operational condition of said storage means.

15. An apparatus according to claim 14 in which the information relating to the operational condition of said apparatus includes information that said storage means needs refilling.

16. An apparatus according to claim 1 in which said retrieval means further comprises memory means which notes where each item of stock is located in said storage means.

17. An apparatus according to claim 16 in which, said retrieval means comprises one or more containers arranged on a chain means, said containers being movable within said storage means enabling different containers to be presented at said delivery means, in which, in use, recall of the location of an item of stock from said memory means allows the chain means to be driven in the direction bringing said item of stock to said delivery means in the least movement of said chain means.

18. An apparatus according to claim 1 in which a stock level sensor is provided to monitor the amount of stock remaining in said apparatus.

19. An apparatus according to claim 1 in which said apparatus monitors the amount of stock within said storage means by counting the number of items of stock within said storage means and updates this level after each retrieval of an item of stock.

* * * * *